Patented Aug. 25, 1953

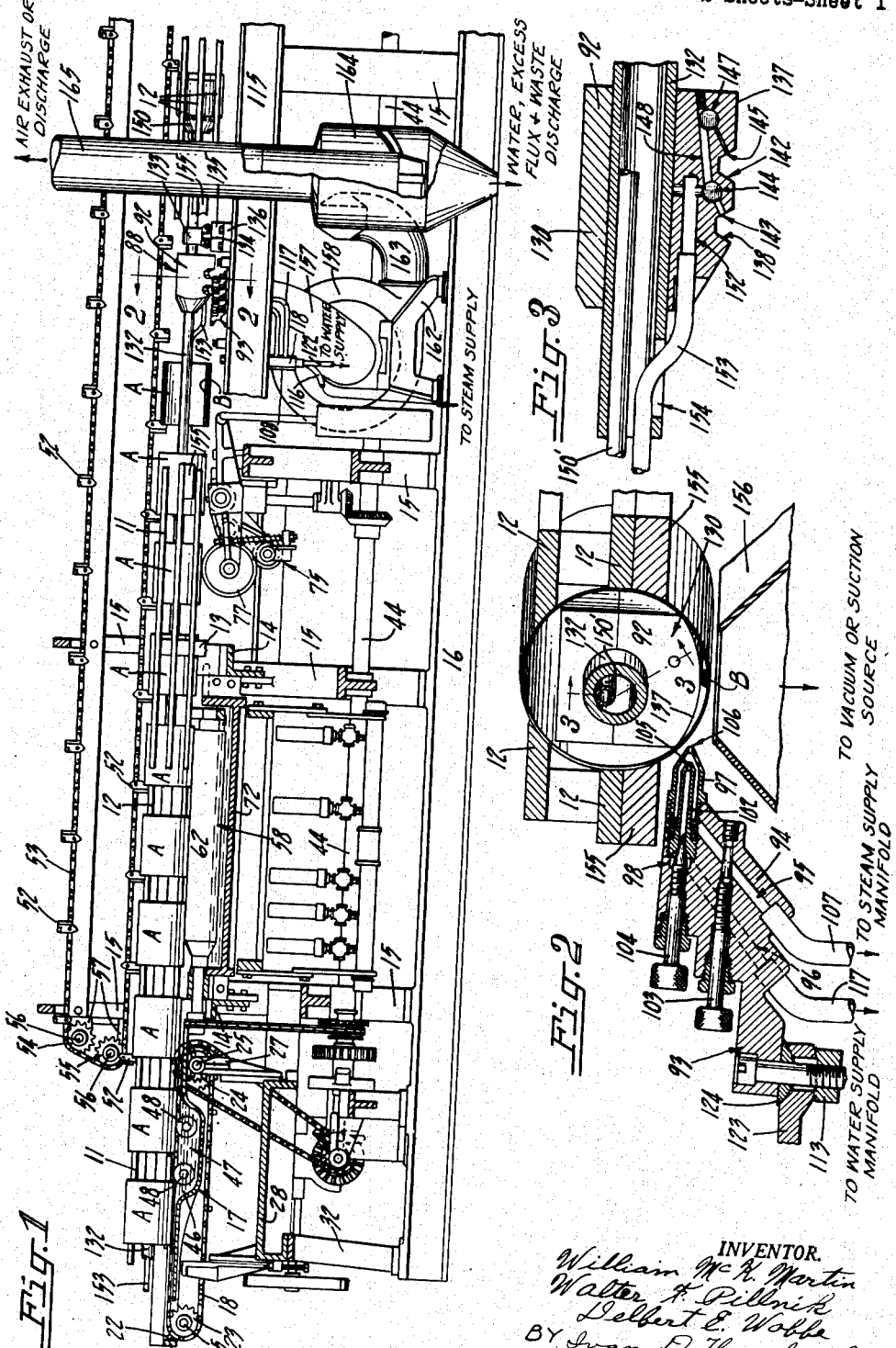

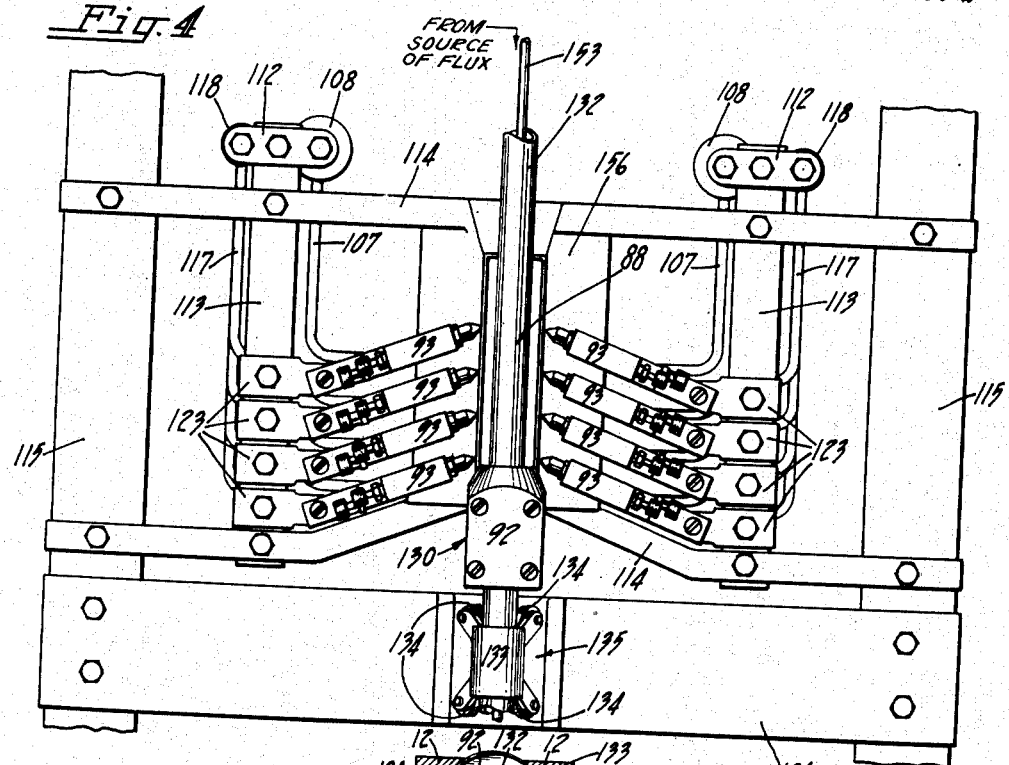
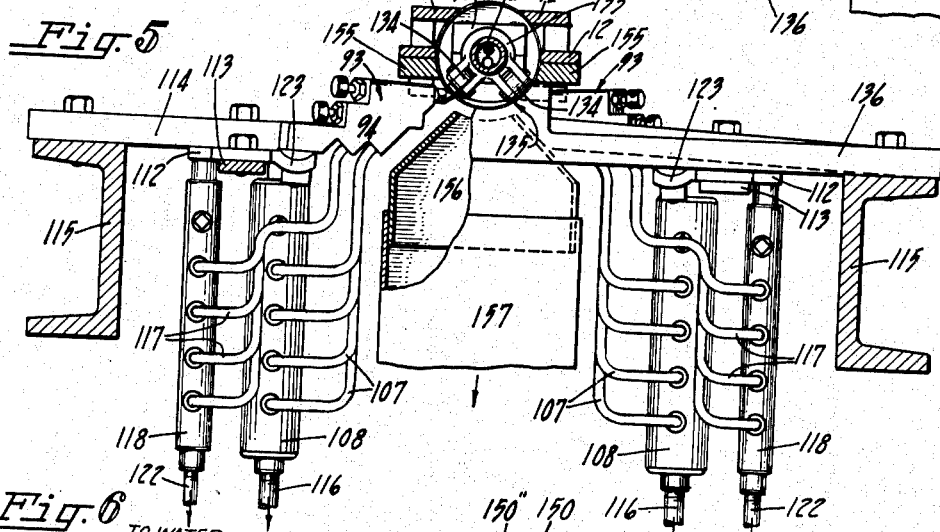
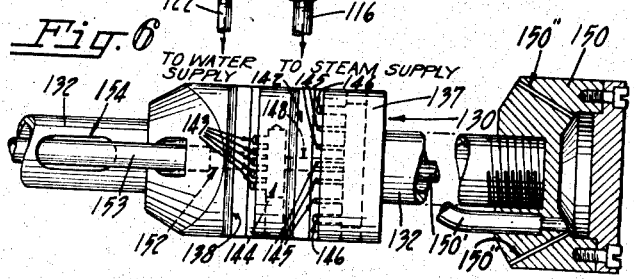

2,650,178

UNITED STATES PATENT OFFICE 2,650,178

METHOD OF WASHING THE SIDE SEAMS OF CAN BODIES

William McK. Martin, San Mateo, Calif., and Walter F. Pillnik, Harvey, and Delbert E. Wobbe, Maywood, Ill., assignors to American Can Company, New York, N. Y., a corporation of New Jersey Original application December 13, 1943, Serial No. 514,124, now Patent No. 2,461,559, dated February 15, 1949. Divided and this application November 8, 1948, Serial No. 58,868

4 Claims. (Cl. 134—15)

The present invention relates to a method of soldering the side seams of sheet metal can bodies and has particular reference to removing excess flux and foreign material from the seams after they have been soldered. This is a division of our United States Patent Number 2,461,559, issued February 15, 1949, on Apparatus for Washing the Side Seams of Can Bodies (pending application Serial Number 514,124, filed December 13, 1943).

In manufacturing sheet metal can bodies having soldered side seams, the seams usually are prepared with a fluxing material prior to the soldering operation. After having been soldered the seams are usually wiped off to remove excess solder. This wiping operation carries away most of the excess flux and other foreign material.

These operations are performed on the outside of the can bodies and have no effect upon materials which may collect on the seam inside the bodies. In most cases the small quantity of such material left on a can body seam is negligible. However, where can bodies are to be used for the packing of certain products it is desirable to remove every trace of flux from the side seam before other subsequent operations are performed on the bodies.

The instant invention contemplates complete removal of the excess flux on a can body side seam from inside as well as from outside the body by a method of applying liquid sprays having a high velocity fluid impeller that scour and wash away the flux and other foreign materials which may become baked or otherwise deposited onto the body as a result of the soldering operation, while the body moves along a path of travel through the sprays.

An object of the invention is the provision of a method of washing or cleaning the side seams of can bodies wherein a spray of a cleaning fluid is directed against the side seams of the can bodies as they pass along a path of travel on a horn of a soldering machine so that excess flux and other foreign material will be washed off the bodies.

Another object is the provision of such a method of washing can bodies wherein the seam on the inside of the body is washed simultaneously with the washing of the seam on the outside of the body.

Numerous other objects and advantages of the invention will be apparent as it is better understood from the following description, which, taken in connection with the accompanying drawings, discloses a preferred embodiment thereof.

Referring to the drawings:

Figure 1 is a longitudinal section of one form of machine for carrying out the method steps of the present invention, with parts broken away;

Figure 2 is an enlarged fragmentary sectional view through a can body washing station in the machine shown in Fig. 1 taken substantially along the line 2—2 in that view and showing inside and outside spraying devices;

Fig. 3 is a sectional view taken substantially along the broken lines 3—3 in Fig. 2;

Fig. 4 is a top plan view of the can body washing station in the machine shown in Fig. 1, drawn to an enlarged scale, with parts broken away;

Fig. 5 is an end view of the washing station shown in Fig. 4 with parts broken away, parts in section; and Fig. 6 is an under side view of the inside spraying device shown in Figs. 2 and 3.

As a preferred embodiment of the present method invention the drawings illustrate one possible form of a can body soldering machine for making tubular metallic can bodies and for carrying out the method steps of the invention. This machine is of the form fully described in the United States Patent No. 1,338,716, issued May 4, 1920, to M. E. Widell. In the instant invention previously prepared can bodies A are advanced continuously in a spaced and orderly procession in an outside horn 11 for fluxing and soldering a side seam B, which side seam thereafter is cleaned of excess or unused flux and of other foreign material.

The outside horn 11 is of the usual type, made up of spaced bars 12 extending longitudinally of the machine. These bars are supported on brackets 13 carried on cross frames 14 secured to side frames 15 mounted on a main base 16 (Fig. 1). The can bodies A are fed along the horn 11 and through an initial or fluxing station 17 by an endless feed-in conveyor 18 having feed fingers 22 at spaced intervals therealong.

The conveyor 18 is located beneath the horn 11 and is at the left (as viewed in Fig. 1). This conveyor passes over suitable chain sprockets 23, 24 carried on studs 25 secured in brackets 26, 27. The brackets 26, 27 are supported on an intermediate frame 28 carried on an end frame 32 and side frame 15. The end frame 32 like the side frames 15, is mounted on the main base 16. The conveyor is operated in any suitable manner in time with the other moving parts of the machine, as for example, by way of a connection with a main drive shaft 44 as disclosed in the above mentioned Widell patent.

As the conveyor 18 advances the can bodies A

the machine to a place where the side seam of the body is still open as is usual in can body manufacture. The tube at the end in the washing station 88 is supported in a bracket 133 (see also Fig. 1).

The bracket 133 carries a plurality of support rollers 134 which normally engage against a curved support shoe 135 disposed adjacent the horn 11 and formed at the center of a cross bar 136 (Figs. 4 and 5). The cross bar is secured to the channel beams 115. The tube 132 with the inside spray nozzle unit 92 thus is permitted to float and provide passage for the can bodies A as they move by and beyond this inside nozzle unit in their advancement along the horn.

The inside unit block member 130 preferably is formed with a curved bottom or under side 137. This is best illustrated in Fig. 2 where the mid or central section of the curved bottom is bridged across and clear of the side seam B while the opposite or outer sections of the curved bottom engage the inside surface of each can body. This forms a shield and protects the remaining inside surface of the body. This curved bottom has two transverse grooves 138, 142 cut therein (see also Figs. 3 and 6). These grooves provide clearance for the outlet ends of the two sets or rows of nozzle orifices 143, 145 formed in the block member 130.

The orifices 143 open out into the groove 138 and are spaced comparatively close to each other. There are five such orifices and they extend forward, in the direction of travel of the can bodies along the horn, into a transverse channel 144 formed in the block member.

The orifices 145 open out into the groove 142 and are smaller in diameter and are spaced further apart than the orifices 143. In this group there are five orifices 145. In addition and at the two ends of this row of orifices are two larger orifices 146, the latter being of the same diameter as the orifices 143. The orifices 145, 146 extend forward through the block member at an angle and communicate with a transverse channel 147 formed in the member.

The transverse channels 144, 147 have communication with each other by way of a channel 148 and the channel 144 also communicates with an inlet channel 152. One end of the inlet channel 152 leads from the open end of a pipe 153 which is secured in the block member 130 (Fig. 3). This pipe extends through the center of the tube from its rear end and where it passes into the nozzle block it dips down through an opening 154 in the tube 132. This is a supply pipe and leads from a suitable source of cleaning fluid, such as water, or the fluid may be a mixture of steam and water.

Hence the cleaning fluid supplied to the nozzle 92 is forced out of the orifices 143, 145, 146 in a series of concentrated jets or sprays of the fluid. The jets of fluid from the first set of orifices 143 strike against the inside of the can body at the side seam, as the body is moving past, and dissolve, scour, and remove any adhering excess flux on the inside of the body. As the can body continues its advancement the second series of jets of fluid from the second set of orifices 145, 146 strike the body seam. The jets from the orifices 145 are finer and less concentrated while the coarser sprays from the orifices 146 confine the curtain of spray from the finer sprays. This second set of jets is for the purpose of removing free water and foreign matter remaining on the inside surface of the can body.

Since excess flux on can bodies is confined largely to the region of the side seam, it is desirable to direct the cleaning to this region and to keep the remainder of the body dry during the washing operations just described. On the outside of the can bodies this is done by outside shields or plates 155 (Figs. 2 and 5) disposed on opposite sides of the path of travel of the bodies. These shields protect the major portion of each body from the spray of the outside nozzles 93. The outside shields may be supported in any suitable manner on the horn bars 12. The body construction of the inside nozzles 92 inherently lends itself to protection of substantially all of the inside surface of the can bodies above the opposite ends of the curved bottom 137, as hereinbefore explained, and thus requires no other shield.

In some cases it is or may be desirable to completely dry the inside surfaces of the moving can bodies. For this purpose a drying head 150 (Figs. 1 and 6) is located adjacent the inside spray nozzle unit 92. The head is threadedly carried on the outer end of the tube 132 and is formed with a sealed chamber which communicates with a fluid impeller pipe 150' which extends back through the tube adjacent the pipe 153 to the source of impeller. Discharge orifices 150" formed in the head at an angle to the path of travel of the can bodies along the horn, communicate with the chamber. There are a plurality of these orifices arranged in a circle around the inner face of the head.

Hence the drying fluid, dry steam, compressed air, or gas as the case may be, supplied to the chamber by way of the pipe 150', issues from the discharge orifices 150" and impinges at high velocity against the inside surface of the body and sweeps out any residual droplets of the cleaning fluid, leaving the surface dry.

Following the washing of the can bodies at the station 88 (Fig. 1) the bodies are in condition for removal from the instant machine for deposit onto an adjacent machine or other suitable place of discharge. This is effected by continued movement of the bodies along the horn 11 following which they are discharged toward the right (as viewed in Fig. 1).

The used or spent cleaning fluid, excess flux and other waste matter removed from the can bodies at the washing station 88, is held under control against spattering onto adjacent can bodies and parts of the machine by vacuum which draws these waste materials down into a receiving means 156. This receptor is located directly beneath the body horn 11 (Figs. 2 and 5) and is suspended from the cross rails 114. The vacuum is created in a suction manifold 157 connected to the lower end of the receptor and in turn leading to a suction device or fan 158 (Fig. 1).

The suction device 158 is located beneath the washing station and is supported on legs 162 mounted on the main base frame 16. This suction device may be operated in any suitable manner from the main shaft 44. The waste materials thereafter are discharged through a pipe connection 163 into a cyclone separator 164. In this separator the water, excess flux and other waste materials are discharged from the bottom while the air is discharged from a pipe 165 extending upwardly from the separator and leading to a suitable place of exhaust.

It is thought that the invention and many of its attendant advantages will be understood from the foregoing description, and it will be apparent that various changes may be made in the steps of the process described and their order or accomplishment without departing from the spirit and scope of the invention or sacrificing all of its material advantages, the process hereinbefore described being merely a preferred embodiment thereof.

We claim:

1. A method of removing adhering particles of foreign matter from the side seams of tubular container bodies after the fluxing and soldering of the seams of the bodies, which method comprises passing container bodies in processional order with the side seams in axial alignment, mixing a liquid cleaning substance with steam, projecting the mixture at high velocity in a coarse spray against said fluxed and soldered side seams with a dissolving and scouring action, then projecting a finer spray of the mixture at higher velocity against said side seams to remove the dissolved particles, simultaneously flanking the said finer spray by coarse sprays to confine the action of said finer spray to said seams and to prevent spattering of the dissolved particles onto adjacent can bodies, and simultaneously drawing away the spent cleaning liquid and the excess foreign matter from the passing container bodies.

2. A method of removing adhering particles of foreign matter including flux from the side seams of tubular container bodies after the fluxing and soldering of the seams of the bodies, which method comprises passing container bodies in processional order with the side seams in alignment, mixing a liquid cleaning substance with steam, first projecting said mixture at high velocity against said fluxed and soldered side seams as a coarse spray of cleaning fluid for dissolving the foreign particles and scouring the side seams, then projecting a finer spray of cleaning fluid at higher velocity against the surface of the side seam already sprayed to wash away the dissolved particles, and simultaneously confining said fine sprays by transversely directed coarse sprays to concentrate and prevent splashing of the fine sprays.

3. A method of removing adhering particles of foreign matter from fluxed and soldered side seams of tubular container bodies, which method comprises advancing said container bodies in processional order with the side seams in axial alignment, mixing a cleaning substance with steam, projecting said cleaning mixture as a coarse spray toward the advancing side seam areas for dissolving the foreign matter and scouring the side seams, then projecting a finer spray of said cleaning mixture at higher velocity against said side seams rearwardly of and angularly toward said coarse spray to dislodge and wash away the foreign matter so that said angularly directed finer spray is confined by said coarse spray to prevent spattering of the dislodged foreign matter onto adjacent can bodies.

4. A method of removing adhering particles of foreign matter from fluxed and soldered side seams of tubular container bodies, which method comprises advancing said container bodies in processional order with the side seams in axial alignment, mixing a cleaning substance with steam, projecting said cleaning mixture at high velocity as an advance coarse spray toward the advancing side seam areas for dissolving the foreign matter and scouring the side seams, then projecting a finer spray of said cleaning mixture at higher velocity against said side seams rearwardly of and angularly toward said coarse spray to dislodge and wash away the dissolved foreign matter, and simultaneously flanking said finer spray by coarse sprays so that said angularly directed finer spray is confined by said advance and flanking coarse sprays to prevent spattering of the dislodged foreign matter onto adjacent can bodies.

WILLIAM McK. MARTIN.
WALTER F. PILLNIK.
DELBERT E. WOBBE.

References Cited in the file of this patent
UNITED STATES PATENTS

| Number | Name | Date |
|---|---|---|
| 595,704 | Fellows | Dec. 21, 1897 |
| 595,705 | Fellows | Dec. 21, 1897 |
| 1,045,929 | Zunner | Dec. 3, 1912 |
| 1,298,973 | Leahy | Apr. 1, 1919 |
| 1,412,979 | Sundh | Apr. 18, 1922 |
| 1,814,551 | Graban | July 14, 1931 |
| 1,918,661 | Phelps | July 18, 1933 |
| 2,065,466 | Horn | Dec. 22, 1936 |
| 2,240,364 | Kimball | Apr. 29, 1941 |